United States Patent
Danov

(10) Patent No.: US 11,352,909 B2
(45) Date of Patent: Jun. 7, 2022

(54) APPARATUS AND METHOD FOR PROVIDING HEAT, COLD AND/OR ELECTRIC POWER

(71) Applicant: Siemens Aktiengesellschaft, Munich (DE)

(72) Inventor: Vladimir Danov, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/253,316

(22) PCT Filed: May 16, 2019

(86) PCT No.: PCT/EP2019/062601
§ 371 (c)(1),
(2) Date: Dec. 17, 2020

(87) PCT Pub. No.: WO2019/242948
PCT Pub. Date: Dec. 26, 2019

(65) Prior Publication Data
US 2021/0270151 A1 Sep. 2, 2021

(30) Foreign Application Priority Data
Jun. 19, 2018 (EP) .................................... 18178554

(51) Int. Cl.
*F01K 3/12* (2006.01)

(52) U.S. Cl.
CPC ............ *F01K 3/12* (2013.01); *F05D 2220/31* (2013.01); *F05D 2260/42* (2013.01)

(58) Field of Classification Search
CPC ..... F01K 3/12; F05D 2220/31; F05D 2260/42
See application file for complete search history.

(56) References Cited

U.S. PATENT DOCUMENTS

| | | | |
|---|---|---|---|
| 10,280,803 B2 | 5/2019 | Ortmann et al. | |
| 2010/0251711 A1 | 10/2010 | Howes et al. | 60/659 |
| 2010/0257862 A1 | 10/2010 | Howes et al. | 60/682 |
| 2011/0094231 A1* | 4/2011 | Freund | F02C 6/16 60/727 |
| 2011/0100010 A1* | 5/2011 | Freund | F02C 6/16 60/659 |

(Continued)

FOREIGN PATENT DOCUMENTS

| | | | |
|---|---|---|---|
| DE | 10 2009 027 543 | 1/2011 | ............. G01C 21/34 |
| DE | 102012222414 A1 | 6/2014 | ............. F01K 11/00 |

(Continued)

OTHER PUBLICATIONS

Search Report for International Application No. PCT/EP2017/079762, 11 pages, dated Dec. 22, 2017.

(Continued)

*Primary Examiner* — Shafiq Mian
(74) *Attorney, Agent, or Firm* — Slayden Grubert Beard PLLC

(57) ABSTRACT

Various embodiments include a system for providing heat, cold, and/or electric power comprising: a first and a second compressor; a first and a second expander; and a first heat store and a second heat store. An output of the first compressor is thermally coupled to a first input of the first heat store and to a second input of the second heat store. An output of the second compressor is thermally coupled to a first input of the second heat store and to a second input of the first heat store. An input of the first expander is thermally coupled to a first output of the first heat store and to a second output of the second heat store. An input of the second expander is thermally coupled to a first output of the second heat store and to a second output of the first heat store.

13 Claims, 1 Drawing Sheet

(56) References Cited

U.S. PATENT DOCUMENTS

| | | | | |
|---|---|---|---|---|
| 2014/0298813 | A1* | 10/2014 | Brunhuber | F01K 3/006 60/645 |
| 2015/0267612 | A1* | 9/2015 | Bannari | F01D 15/10 60/650 |
| 2015/0360720 | A1 | 12/2015 | Li | B62D 15/02 |
| 2015/0369613 | A1 | 12/2015 | Stadler | G01C 21/26 |
| 2016/0216044 | A1 | 7/2016 | Narine et al. | 60/327 |
| 2016/0238397 | A1 | 8/2016 | Caira | G01C 21/34 |
| 2017/0350658 | A1* | 12/2017 | Kerth | F02C 1/10 |
| 2018/0128171 | A1* | 5/2018 | Morgan | F02C 6/16 |
| 2020/0340399 | A1 | 10/2020 | Kubo et al. | |

FOREIGN PATENT DOCUMENTS

| | | | | |
|---|---|---|---|---|
| DE | 102016119245 | A1 | 4/2018 | F01K 27/00 |
| EP | 3296545 | A1 | 3/2018 | F01K 27/00 |
| JP | 2010540831 | A | 12/2010 | F02C 1/04 |
| JP | 2016211515 | A | 12/2016 | F02C 6/00 |
| JP | 2018505377 | A | 2/2018 | F17C 5/06 |
| JP | 2018178977 | A | 11/2018 | F02C 6/16 |
| WO | 2016/169928 | A1 | 10/2016 | F01K 25/00 |

OTHER PUBLICATIONS

Search Report for EP Application No. 16465556.2, 8 pages, dated Mar. 29, 2017.
International Search Report and Written Opinion, Application No. PCT/EP2019/062601, 7 pages, dated Jul. 9, 2019.
JP 2018505377 A, US 2016/0216044 A1.
JP 2018178977 A, US 2020/0340399 A1.
Korean Notice of Allowance, Application No. 1020217001467, 3 pages, dated Mar. 28, 2022.

* cited by examiner

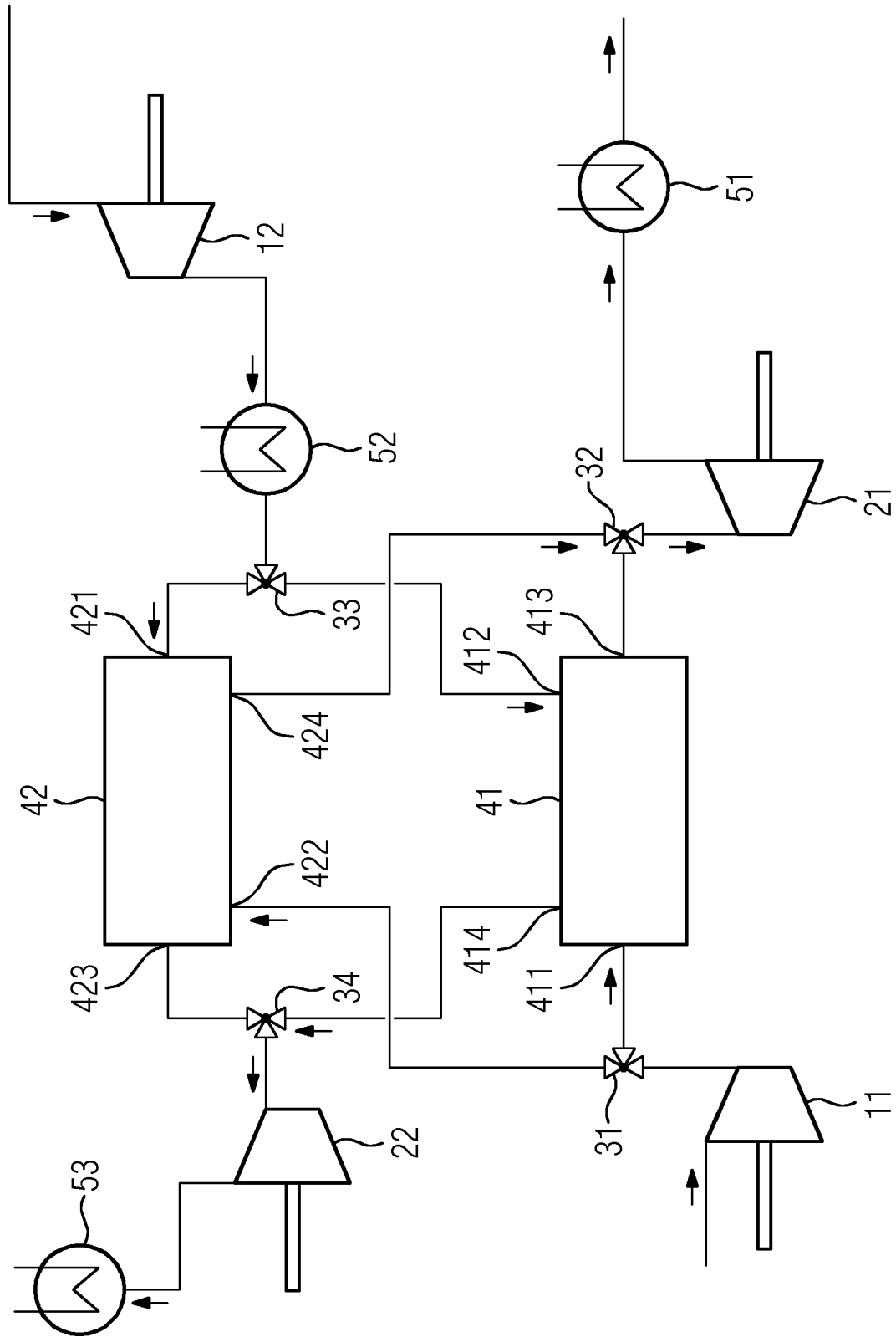

APPARATUS AND METHOD FOR PROVIDING HEAT, COLD AND/OR ELECTRIC POWER

CROSS-REFERENCE TO RELATED APPLICATIONS

This application is a U.S. National Stage Application of International Application No. PCT/EP2019/062601 filed May 16, 2019, which designates the United States of America, and claims priority to EP Application No. 18178554.4 filed Jun. 19, 2018, the contents of which are hereby incorporated by reference in their entirety.

TECHNICAL FIELD

The present disclosure relates to heat, cold, and/or electric power. Various embodiments include systems and/or methods for providing heat, cold and/or electric power.

BACKGROUND

To reduce carbon dioxide emissions, it is critical to use flexible and efficient conversion units that generate different forms of energy and/or convert them into one another (power to cold, power to heat, heat to power, etc.). A large number of conversion units that provide electric power (current), heat, and/or cold for a consumer, for example a building, are known from the prior art. To provide the cited forms of energy, the prior art involves multiple apparatuses being operated in parallel or connected in parallel. By way of example, shopping centers require electric power, heat, and cold simultaneously. So that these forms of energy are provided at the same time, electric current can be drawn from an electricity grid, heat can be generated by means of a gas boiler and cold can be provided by means of a refrigeration machine.

Furthermore, some combinations are known, for example combined heat and power plants (CHP plants for short). These involve a gas engine generating electric power and heat at the same time. Furthermore, district heating could be used for operating an absorption refrigeration system for providing cold.

SUMMARY

The teachings of the present disclosure may support providing an apparatus and a method by means of which provision of heat and cold, in particular at the same time, and/or electric power is made possible efficiently. For example, some embodiments include an apparatus (1) for providing heat, cold and/or electric power, comprising: a first and a second compressor (11, 12) for compressing a working fluid; a first and a second expander (21, 22) for expanding the working fluid; and a first and a second heat store (41, 42); characterized in that an output of the first compressor (11) is thermally coupled to a first input (411) of the first heat store (41) and to a second input (422) of the second heat store (42); an output of the second compressor (12) is thermally coupled to a first input (421) of the second heat store (42) and to a second input (412) of the first heat store (41) an input of the first expander (21) is thermally coupled to a first output (413) of the first heat store (41) and to a second output (424) of the second heat store (41); and an input of the second expander (22) is thermally coupled to a first output (423) of the second heat store (42) and to a second output (414) of the first heat store (41).

In some embodiments, each of the thermal couplings is formed by means of a three-way valve (31).

In some embodiments, the first heat store (41) has a first and a second end region, wherein the first input (411) of the first heat store (41) and the second output (414) of the first heat store (41) are arranged within the first end region of the first heat store (41), and the first output (413) of the first heat store (41) and the second input (412) of the first heat store (41) are arranged within the second end region of the first heat store (41).

In some embodiments, the second heat store (42) has a first and a second end region, wherein the first input (421) of the second heat store (42) and the second output (424) of the second heat store (42) are arranged within the second end region of the second heat store (42), and the first output (423) of the second heat store (42) and the second input (422) of the second heat store (42) are arranged within the first end region of the second heat store (42).

In some embodiments, the first end regions of the heat stores (41, 42) each have a higher temperature than the second end regions associated with the respective heat store (41, 42).

In some embodiments, the first compressor (11) has a greater compression than the second compressor (12).

In some embodiments, the first compressor (11) has a compression in the range from 1 megapascal to 4 megapascals, or in the range from 0.5 megapascal to 3 megapascals, and the second compressor (12) has a compression in the range from 0.1 megapascal to 1 megapascal, or in the range from 0.1 megapascal to 0.5 megapascal.

In some embodiments, the apparatus (1) comprises a first heat exchanger (41) for providing the cold, wherein the first heat exchanger (41) is arranged downstream of the first expander (21).

In some embodiments, the apparatus (1) comprises a second heat exchanger (52) and at least one part of a district heating network, wherein the second heat exchanger (52) is thermally coupled at least to the part of the district heating network.

In some embodiments, the second heat exchanger (52) is arranged downstream of the second compressor (12) and upstream of the first input (421) of the second heat store (42).

In some embodiments, the apparatus (1) comprises a third heat exchanger (53) for providing heat, wherein the third heat exchanger (53) is arranged downstream of the second expander.

A method for operating an apparatus as described herein for providing at least cold, comprising the steps of: compressing the working fluid by means of the first compressor (11); introducing at least some of the compressed working fluid into the first heat store (41) by means of the first input (411) of the first heat store (41); introducing at least some of the compressed working fluid cooled by a heat transfer from the working fluid to the first heat store (41) into the input of the first expander (21) by means of the first output (413) of the first heat store (41); and expanding the working fluid introduced into the first expander (21) by means of the first expander (21).

In some embodiments, the method further comprises introducing at least some of the working fluid compressed by means of the first compressor (11) into the second heat store (42) by means of the second input (422) of the second heat store (42).

As another example, some embodiments include a method for operating an apparatus as described herein for providing at least heat, comprising the steps of: compressing the working fluid by means of the second compressor (12); introducing at least some of the compressed working fluid into the second heat store (42) by means of the first input (421) of the second heat store (42); introducing at least some of the compressed working fluid heated by a heat transfer from the second heat store (42) to the working fluid into the input of the second expander (21) by means of the first output (423) of the second heat store (42); and expanding the working fluid introduced into the second expander (22) by means of the second expander (22).

In some embodiments, the method further comprises introducing at least some of the working fluid compressed by means of the second compressor (12) into the first heat store (41) by means of the second input (412) of the first heat store (41).

BRIEF DESCRIPTION OF THE DRAWINGS

Further advantages, features, and details of the teachings herein emerge from the exemplary embodiments described below, and with reference to the drawing, in which the single FIGURE shows a schematic representation of the design of an apparatus incorporating teachings of the present disclosure. Elements of the same type, of the same value or having the same effect may be provided with the same reference signs in the FIGURE.

The FIGURE shows a schematic depiction of an apparatus incorporating teachings of the present disclosure.

DETAILED DESCRIPTION

Some embodiments of the teachings herein include an apparatus for providing heat, cold, and/or electric power comprising: a first and a second compressor for compressing a working fluid; a first and a second expander for expanding the working fluid; and a first and a second heat store. In some embodiments, an output of the first compressor is thermally coupled to a first input of the first heat store and to a second input of the second heat store. In some embodiments, an output of the second compressor is thermally coupled to a first input of the second heat store and to a second input of the first heat store. In some embodiments, an input of the first expander is thermally coupled to a first output of the first heat store and to a second output of the second heat store.

In some embodiments, an input of the second expander is thermally coupled to a first output of the second heat store and to a second output of the first heat store.

In some embodiments, some of the cited thermal couplings are formed by a fluidic coupling with reference to the working fluid. The systems described herein can be used to provide or generate heat, cold, and/or electric power (current or electric current) at the same time or at separate times. The apparatus can therefore be operated flexibly on a power market. In other words, the apparatus forms a synergistic concept for a power/heat/cold coupling. In this case, the system may synergistically combine the principle of a Joule cycle (or Brayton cycle) with a plurality of heat stores.

In some embodiments, the apparatus allows for example the provision of heat, cold, and electric power, or for example the provision of just heat, or for example the provision of just cold. If for example heat and cold are generated or provided at the same time, the apparatus typically has an efficiency of above 85 percent, the efficiency being defined by the ratio of the generated heat and cold to the electric power used.

In some embodiments, a method incorporating the teachings herein for operating an apparatus as described herein and/or one of the configurations thereof for providing at least cold comprises: compressing the working fluid by means of the first compressor; introducing at least some of the compressed working fluid into the first heat store by means of the first input of the first heat store; introducing at least some of the compressed working fluid cooled by a heat transfer from the working fluid to the first heat store into the input of the first expander by means of the first output of the first heat store; and expanding the working fluid introduced into the first expander by means of the first expander.

In some embodiments, the method comprises at least the further step of introducing at least some of the working fluid compressed by means of the first compressor into the second heat store by means of the second input of the second heat store. In some embodiments, all of the working fluid can be introduced into the second heat store, in which case the working fluid is not introduced into the first heat store.

In other words, electric power is first of all used for compressing the working fluid by means of the first compressor. On the basis of the compression of the working fluid, said working fluid is heated. As a result of the introduction of at least some of the compressed working fluid into the first heat store, said working fluid delivers at least some of its heat to the first heat store. In other words, at least some of the heat generated by means of the compression is stored or buffer-stored by means of the first heat store. At least some of the working fluid at least partially cooled at the first output of the first heat store is subsequently routed to the input of the first expander, said working fluid being expanded and hence cooled further by means of the first expander. The cooling of the working fluid allows cold to be provided, for example via a first heat exchanger. In this instance the heat generated to provide the cold is not lost, but rather is stored by means of the first heat store for further use. Moreover, electric power is generated and provided by means of the first expander. Furthermore, generating sufficient cold may additionally require some of the heat, in particular a large proportion, to be removed and not stored by means of the first heat store.

In some embodiments, a method for operating an apparatus and/or one of the configurations thereof for providing at least heat comprises: compressing the working fluid by means of the second compressor; introducing at least some of the compressed working fluid into the second heat store by means of the first input of the second heat store; introducing at least some of the compressed working fluid heated by a heat transfer from the second heat store to the working fluid into the input of the second expander by means of the first output of the second heat store; and expanding the working fluid introduced into the second expander by means of the second expander.

In some embodiments, the method comprises introducing at least some of the working fluid compressed by means of the second compressor into the first heat store by means of the second input of the first heat store. In some embodiments, all of the working fluid can be introduced into the first heat store, in which case the working fluid is not introduced into the second heat store.

In other words, electric power is first of all used for compressing the working fluid by means of the second compressor. As a result of the compression of the working fluid, said working fluid is heated. This heat can already be used or provided directly, as a result of which the working fluid would cool. As a result of the introduction of at least some of the compressed working fluid into the second heat store, which is already approximately fully loaded, for example, the introduced working fluid is again or continues to be heated or overheated. It may be therefore advantageous to generate heat when the second heat store is approximately fully loaded, the loading being effected by means of the heat generated during compression by means of the first compressor.

The working fluid is heated because the second compressor typically compresses the working fluid to a lesser degree or extent than the first compressor compresses the working fluid. In other words, the heat generated by means of the compression by means of the first compressor is used to heat the working fluid compressed by means of the second compressor. At least some of the working fluid heated at the first output of the second heat store is subsequently routed to the input of the second expander, this resulting in electric power being generated from the overheated working fluid by means of the second expander. Furthermore, heat can be provided via a third heat exchanger.

In some embodiments, the methods can generate or provide at least heat and cold at the same time. Similar and equivalent advantages of the methods described herein arise for the apparatus and/or one of the configurations thereof.

In some embodiments, each of the thermal couplings is formed by means of a three-way valve. In other words, the output of the first compressor is thermally, in particular fluidically, coupled to the first input of the first heat store and to the second input of the second heat store via a three-way valve. Furthermore, the first output of the first heat store and the second output of the second heat store are thermally, in particular fluidically, coupled to the input of the first expander via a three-way valve. Furthermore, the output of the second compressor is thermally, in particular fluidically, coupled to the first input of the second heat store and to the second input of the first heat store via a three-way valve. Furthermore, the first output of the second heat store and the second output of the first heat store are thermally, in particular fluidically, coupled to the input of the second expander via a three-way valve.

In some embodiments, the first heat store has a first and a second end region, wherein the first input of the first heat store and the second output of the first heat store are arranged within the first end region of the first heat store, and the first output of the first heat store and the second input of the first heat store are arranged within the second end region of the first heat store. If the first heat store is oriented horizontally, then its first and second end regions may be arranged horizontally opposite one another. If the first heat store is oriented vertically, then its first and second end regions are arranged vertically opposite one another. Regardless of the orientation of the first heat store, its first and second end regions have a temperature difference in relation to one another. The first and second end regions of the first heat store typically have an intermediate region of the first heat store arranged between them that delimits the two end regions of the first heat store.

In some embodiments, the second heat store has a first and a second end region, wherein the first input of the second heat store and the second output of the second heat store are arranged within the second end region of the second heat store, and the first output of the second heat store and the second input of the second heat store are arranged within the first end region of the second heat store. If the second heat store is oriented horizontally, in its first and second end regions are arranged horizontally opposite one another. If the second heat store is oriented vertically, then its first and second end regions are arranged vertically opposite one another. Regardless of the orientation of the second heat store, its first and second end regions have a temperature difference in relation to one another. The first and second end regions of the second heat store typically have an intermediate region of the second heat store arranged between them that delimits the two end regions of the second heat store from one another.

In some embodiments, the first end regions of the heat stores each have a higher temperature than the second end regions associated with the respective heat store. In other words, the first end region of the first heat exchanger is warmer than the second end region of the first heat exchanger and the first end region of the second heat store is likewise warmer than the second end region of the second heat store.

In some embodiments, the first compressor has a greater compression than the second compressor. As a result, the working fluid may be heated to a greater extent by means of the first compressor than by means of the second compressor. This means that the heat generated when the working fluid is compressed by means of the first compressor can be used to heat the working fluid compressed by means of the second compressor, via the second heat store. In this instance the first compressor may have a compression in the range from 1 megapascal to 4 megapascals, or in the range from 0.5 megapascal to 3 megapascals, and the second compressor has a compression in the range from 0.1 megapascal to 1 megapascal, or in the range from 0.1 megapascal to 0.5 megapascal.

In some embodiments, the apparatus comprises a first heat exchanger for providing the cold, wherein the first heat exchanger is arranged downstream of the first expander. This means that the cold generated by means of the first expander can be provided for the consumption thereof.

In some embodiments, the apparatus comprises a second heat exchanger and at least one part of a district heating network, wherein the second heat exchanger is thermally coupled at least to the part of the district heating network. In this instance the second heat exchanger may be arranged downstream of the second compressor and upstream of the first input of the second heat store. This allows the heat generated when the working fluid is compressed by means of the second compressor to be provided, removed and/or used. In some embodiments, the working fluid that was compressed by means of the second compressor cools as a result. The working fluid cooled as a result can then be routed to the first input of the second heat store and/or to the second input of the first heat store.

In some embodiments, the apparatus comprises a third heat exchanger for providing heat, wherein the third heat exchanger is arranged downstream of the second expander. This provides heat.

As shown in the FIGURE, the apparatus 1 may comprise a first compressor 11 and a second compressor 12, which are configured and provided to compress a working fluid. In this instance the first compressor 11 has a greater compression than the second compressor 12. Furthermore, the apparatus 1 has a first expander 21 and a second expander 22, which are designed and provided to expand the working fluid. The apparatus 1 also comprises a first heat store 41 and a second heat store 42. Moreover, the apparatus 1 has a first heat exchanger 51, a second heat exchanger 52 and a third heat exchanger 53.

The first heat store 41 and the second heat store 42 each have a first and a second end region, the respective first end region typically having a higher temperature than the respective second end region. In other words, the first end region is a warm region of the respective heat store 41, 42 and the second end region is a cold region of the respective heat store 41, 42. The temperature gradient inside the respective heat store 41, 42 therefore trends from the first end region thereof (warm) to the second end region thereof (cold).

To describe the operation of the apparatus 1, it is expedient to first mentally divide said apparatus into a first and a second path for the flow of the working fluid. Within the first path the working fluid is compressed by means of the first compressor 11, for example to a pressure of 30 bar, said working fluid then having a temperature of approximately 540 degrees Celsius when air is used as working fluid. This requires approximately 540 kilojoules of electric power per kilogram. The working fluid compressed by means of the first compressor 11 is routed via a first three-way valve 31 to a first input 411 of the first heat store 41 or to a second input 422 of the second heat store 42. The first three-way valve 31 can therefore be used to set whether the working fluid compressed by means of the first compressor 11 is routed to the first input 411 of the first heat store 41 or to the second input 422 of the second heat store 42.

In this instance the mass flow of some or all of the working fluid can be split over said inputs 411, 422. Within the first path all of the working fluid is supplied to the first input 411 of the first heat store 41. Inside the heat store 41, or when thermally coupled to the first heat store 41, the working fluid cools on account of a heat transfer from the working fluid to the first heat store 41, or to a storage medium of the first heat store 41. The working fluid cooled as a result is supplied by means of a first output 413 of the first heat store 41 to an input of the first expander 21 via a second three-way valve 32 and expanded. The expansion cools the working fluid further, the working fluid typically being expanded to a pressure of approximately 1 bar. The working fluid can therefore have a temperature in the range from −50 degrees Celsius to −20 degrees Celsius. In other words, this generates cold. There may be provision for the removal of further heat to generate the cold. The generated cold can subsequently be provided for an external cold consumer by means of the first heat exchanger 51. Cold is therefore provided or generated within the described first path.

Within the second path a working fluid is compressed by means of the second compressor 12. In this instance the compression by means of the second compressor 12 is less than the compression by means of the first compressor 11. By way of example, the working fluid is compressed to a pressure of 5 bar and hence heated to a temperature of approximately 200 degrees Celsius when air is the working fluid. This requires approximately 175 kilojoules of electric power per kilogram. The working fluid compressed and heated by means of the second compressor 12 is supplied to the second heat exchanger 52, which means that the heat produced during the compression is providable by means of the second heat exchanger 52, which is in particular coupled to a district heating network.

The working fluid is subsequently routed to a first input 421 of the second heat store 42 or to a second input 412 of the first heat store by means of a third three-way valve 33. The third three-way valve 33 can therefore be used to set whether the working fluid compressed by means of the second compressor 12 is routed to the first input 421 of the second heat store 42 or to the second input 412 of the first heat store 41. In this instance the mass flow of some or all of the working fluid can be split over said inputs 421, 412. Within the first path all of the working fluid is supplied to the first input 421 of the second heat store 42.

In some embodiments, the second heat store 42 may be already approximately fully loaded. As a result, the working fluid that has been introduced into the second heat store 42 and is in thermal contact with a storage medium of the second heat store is heated, the heated working fluid being supplied to an input of the second expander 22 via a first output 423 of the second heat store 42. At the first output 423 of the second heat store 42 the working fluid has a temperature of approximately 540 degrees Celsius, for example. The working fluid is routed or introduced to the input of the second expander 22 via a fourth three-way valve 34.

Downstream of the second expander 22 the working fluid typically has a pressure of approximately 1 bar and a temperature of approximately 245 degrees Celsius. This heat can be provided by means of a third heat exchanger 53. By way of example, 100 kilojoules of heat per kilogram are generated and provided in this instance.

In some embodiments, the first and second paths are coupled to one another via the first and second heat stores 41, 42. In this instance the thermal coupling is produced by means of the three-way valves 31, 32, 33, 34. In other words, the working fluid compressed by means of the first compressor 11 can be routed to the first input 411 of the first heat store 41 or to the second input 422 of the second heat store 42. The working fluid compressed by means of the second compressor 12 can be routed to the first input 421 of the second heat store 42 or to the second input 412 of the first heat store 41 by means of the third three-way valve 33.

The input of the first expander 21 can be supplied with working fluid from the first output 413 of the first heat store 41 or from the second output 424 of the second heat store 42 by means of the second three-way valve 32. The input of the second expander 22 can be supplied with working fluid from the first output 423 of the second heat store 42 or from the second output 414 of the first heat store 41 by means of the fourth three-way valve 34.

The overall result may be a synergistically thermal coupling by means of which heat and cold and also electric power are able to be generated at the same time or separately from one another efficiently. In other words, the heat generated when the working fluid is compressed by means of the compressor 11 and by means of the second compressor 12 is not lost, but rather is used either to generate heat, to generate electric power and/or to generate cold. The decoupling and use of the different forms of energy is made possible by means of the synergistically combined and coupled heat stores 41, 42.

In some embodiments, the second heat store 42 is loaded by means of the heat generated during generation by means of the first compressor 11 if the first heat store 41 is already fully loaded. As a result, the heat generated when the working fluid is compressed by means of the first compressor 11 may be used for providing cold via the first heat exchanger 51 and/or for providing heat via the third heat exchanger 53.

As a result of the combination of the two paths depicted and described, which is demonstrated by the synergistic connection of the two heat stores 41, 42, the apparatus 1 has an efficiency of above 85 percent in respect of the electric power used when heat and cold are generated at the same time. This provides heat and cold efficiently.

Although the teachings herein have been illustrated and described in more detail by means of the exemplary embodiment, the scope of the disclosure is not limited by the disclosed examples, or other variations can be derived therefrom by a person skilled in the art without departing from the scope of the disclosure.

LIST OF REFERENCE SIGNS 1 apparatus
11 first compressor
12 second compressor
21 first expander
22 second expander
41 first heat store
42 second heat store
51 first heat exchanger
52 second heat exchanger
53 third heat exchanger
411 first input of first heat store
412 second input of first heat store
413 first output of first heat store
414 second output of first heat store
421 first input of second heat store
422 second input of second heat store
423 first output of second heat store
424 second output of second heat store

What is claimed is:

1. A system for providing heat, cold, and/or electric power, the system comprising:
    a first compressor and a second compressor for compressing a working fluid;
    a first expander and a second expander for expanding the working fluid; and
    a first heat store and a second heat store; wherein an output of the first compressor is thermally coupled to a first input of the first heat store and to a second input of the second heat store;
    an output of the second compressor is thermally coupled to a first input of the second heat store and to a second input of the first heat store;
    an input of the first expander is thermally coupled to a first output of the first heat store and to a second output of the second heat store; and
    an input of the second expander is thermally coupled to a first output of the second heat store and to a second output of the first heat store.

2. The system as claimed in claim 1, wherein each of the thermal couplings comprises a three-way valve.

3. The system as claimed in claim 1, wherein:
    the first heat store has a first end region and a second end region;
    the first input of the first heat store and the second output of the first heat store are arranged within the first end region of the first heat store; and
    the first output of the first heat store and the second input of the first heat store are arranged within the second end region of the first heat store.

4. The system as claimed in claim 1, wherein:
    the second heat store has a first and a second end region;
    the first input of the second heat store and the second output of the second heat store are arranged within the second end region of the second heat store; and
    the first output of the second heat store and the second input of the second heat store are arranged within the first end region of the second heat store.

5. The system as claimed in claim 4, wherein the first end regions of each of the heat stores each have a higher temperature than the second end regions associated with each respective heat store.

6. The system as claimed in claim 1, wherein the first compressor has a greater compression than the second compressor.

7. The system as claimed in claim 6, wherein:
    the first compressor has a compression in the range from 1 megapascal to 4 megapascals; and
    the second compressor has a compression in the range from 0.1 megapascal to 1 megapascal.

8. The system as claimed in claim 1, further comprising a first heat exchanger for providing the cold, the first heat exchanger arranged downstream of the first expander.

9. The apparatus as claimed in claim 1, further comprising:
    a second heat exchanger; and
    at least one part of a district heating network;
    wherein the second heat exchanger is thermally coupled at least to the part of the district heating network.

10. The system as claimed in claim 9, wherein the second heat exchanger is arranged downstream of the second compressor and upstream of the first input of the second heat store.

11. The system as claimed in claim 1, further comprising a third heat exchanger for providing heat, the third heat exchanger arranged downstream of the second expander.

12. A method for operating an apparatus for providing at least cold, the method comprising:
    compressing a working fluid into a first compressed working fluid using a first compressor;
    introducing a first portion of the first compressed working fluid into a first heat store through a first input of a first heat store;
    compressing the working fluid into a second compressed working fluid in a second compressor;
    introducing a first portion of the second compressed working fluid into the first heat store through a second input of the first heat store;
    introducing a second portion of the second compressed working fluid into the second heat store through a second input of the second heat store;
    introducing at least some of the first portion of the compressed working fluid cooled by a heat transfer from the working fluid to the first heat store into an input of a first expander from a first output of the first heat store;
    introducing a second portion of the first compressed working fluid into a second heat store through a first input of the second heat store and removing heat from the second portion of the compressed working fluid into the second heat store;
    introducing at least some of the second portion of the compressed working fluid cooled in the second heat store into an input of a second expander from a second output of the second heat store;
    expanding the working fluid introduced into the first expander in the first expander; and
    expanding the working fluid introduced into the second expander in the second expander.

13. The method as claimed in claim 12, further comprising introducing at least some of the working fluid compressed by means of the first compressor into a second heat store through a second input of the second heat store.

* * * * *